(12) United States Patent
Ludwig et al.

(10) Patent No.: US 9,275,006 B2
(45) Date of Patent: Mar. 1, 2016

(54) CONFIGURATION FILE UPDATER

(71) Applicant: Google Inc., Mountain View, CA (US)

(72) Inventors: Adrian L. Ludwig, Atherton, CA (US); Curtis Gerald Condra, IV, Sunnyvale, CA (US); Nicholas Neil Kralevich, IV, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 291 days.

(21) Appl. No.: 13/717,860

(22) Filed: Dec. 18, 2012

(65) Prior Publication Data

US 2014/0122862 A1 May 1, 2014

Related U.S. Application Data

(60) Provisional application No. 61/719,469, filed on Oct. 28, 2012.

(51) Int. Cl.
*G06F 15/177* (2006.01)
*G06F 9/445* (2006.01)

(52) U.S. Cl.
CPC ............... *G06F 15/177* (2013.01); *G06F 8/65* (2013.01)

(58) Field of Classification Search
CPC ................................ G06F 15/177; G06F 8/65
See application file for complete search history.

(56) References Cited

U.S. PATENT DOCUMENTS

| | | | | |
|---|---|---|---|---|
| 7,568,114 B1 * | 7/2009 | Schlafly | | 713/194 |
| 2003/0229781 A1 * | 12/2003 | Fox et al. | | 713/155 |
| 2004/0181790 A1 * | 9/2004 | Herrick | | 717/168 |
| 2006/0190574 A1 * | 8/2006 | Yoshikawa et al. | | 709/221 |
| 2009/0144362 A1 * | 6/2009 | Richmond et al. | | 709/203 |
| 2009/0265756 A1 * | 10/2009 | Zhang et al. | | 726/1 |
| 2009/0299972 A1 * | 12/2009 | Merchant et al. | | 707/3 |
| 2011/0159878 A1 * | 6/2011 | Bender et al. | | 455/445 |
| 2012/0130567 A1 * | 5/2012 | Noffsinger et al. | | 701/19 |
| 2012/0177032 A1 * | 7/2012 | Chitty et al. | | 370/352 |
| 2013/0042227 A1 * | 2/2013 | Little | | G06F 8/65 717/168 |
| 2013/0091259 A1 * | 4/2013 | Murphy et al. | | 709/221 |

OTHER PUBLICATIONS

International Search Report and Written Opinion in Application No. PCT/US2013/066117 mailed Feb. 6, 2014.
Rubin, "Trusted distribution of 1-20 software over the Internet", Network and Distributed System Security,1995, Proceedings of the Sym Posium ON, San Diego, CA, USAIEEE Comput. Soc., Feb. 1995, Feb. 16, 1995, pp. 47-53.

* cited by examiner

*Primary Examiner* — Thomas Lee
*Assistant Examiner* — Chad Erdman
(74) *Attorney, Agent, or Firm* — Morris & Kamlay LLP (57) ABSTRACT

A method for updating configuration information includes, in a computing device including a processor, memory, and an operating system, initiating an update to at least one configuration setting of the computing device. The update may be downloaded from at least one update data source. The update may include configuration update data and configuration update metadata. The update may be verified by comparing the configuration update metadata with metadata associated with a current version of the at least one configuration setting. The update may be installed if it is verified. The update to the at least one configuration setting may be installed based on an intent from an unsecure component of the computing device. The unsecure component may include content consuming application installed on the device, a component of a computing platform of the device, and/or an update-seeker application installed on the device.

20 Claims, 4 Drawing Sheets

CONFIGURATION FILE UPDATER

CROSS-REFERENCE TO RELATED APPLICATIONS/INCORPORATION BY REFERENCE

This application makes reference to and claims priority to U.S. Provisional Application Ser. No. 61/719,469, filed on Oct. 28, 2012, entitled "Software Exploit Detection," which is incorporated herein by reference in its entirety.

BACKGROUND

Conventional software updates pushed to, or downloaded by, computing devices do not include updates to configuration settings of the computing device. Additionally, when configuration settings are communicated to a computing device, there may be incompatibility between the current version of the configuration settings and the new (updated) version of the configuration settings (e.g., if the computing device has been turned off for an extended period of time, the device may have skipped an update version of the configuration settings). Furthermore, many third party applications may attempt to download malicious code in the form of configuration data.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is provided for configuration file updater, substantially as shown in and/or described in connection with at least one of the figures, as set forth more completely in the claims.

In accordance with an example embodiment of the disclosure, a method for updating configuration information includes, in a computing device including a processor, memory, and an operating system, initiating an update to at least one configuration setting of the computing device. The update may be downloaded from at least one update data source. The update may include configuration update data and configuration update metadata. The update may be verified by comparing the configuration update metadata with metadata associated with a current version of the at least one configuration setting. The update may be installed if it is verified. The update to the at least one configuration setting may be installed based on intent from an unsecure component of the computing device. The unsecure component may include content consuming application installed on the device, a component of a computing platform of the device, and/or an update-seeker application installed on the device.

In accordance with another example embodiment of the disclosure, a non-transitory, machine-readable storage medium may be disclosed, having stored thereon a computer program having at least one code section for updating configuration information. The at least one code section may be executable by a machine including a processor, memory, and an operating system, for causing the machine to perform a method including initiating an update to at least one configuration setting of the computing device. The update may be downloaded from at least one update data source. The update may include configuration update data and configuration update metadata. The downloaded update may be verified by comparing the configuration update metadata with metadata associated with a current version of the at least one configuration setting. If the update is verified, the update to the at least one configuration setting may be installed.

These and other advantages, aspects and features of the present disclosure, as well as details of illustrated implementation(s) thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The present disclosure relates to a method and system for configuration file updater. Targeted configuration data may be delivered only to specific clients using a server (e.g., only clients using a specific API version may be targeted). The server may initially verify that the client is in a known state prior to installing the configuration. The known state may be confirmed by comparing the hash of the client's current configuration with a known hash of a desired (intended) configuration. If the hashes do not match, then it may be concluded that the client's current configuration is not the desired configuration (i.e., the client is not in the known state so the configuration should not be installed). Alternatively, unique configuration features in a subset of clients may be detected, included in the common configuration data, and then the common configuration data may be populated to a remaining subset of clients that originally did not have the unique feature. The targeted configuration data updates disclosed herein may be implemented for, for example, certificate pinning, premium SMS detection (update in premium service phone numbers used by one or more device applications), time zone information or settings updates (time zone information is country-specific and may need to be updated regularly for a traveling user) and other areas (e.g., targeted updating of configuration data for specific clients, as mentioned in the preceding paragraph).

In accordance with an example embodiment of the disclosure, a configuration file updater may be used to provision, for example, small-to-medium amounts of configuration data to computing devices in a device ecosystem (e.g., mobile device ecosystem). More specifically, the configuration file updater may be used to provide a mechanism for updating not-trivially-small amounts of data (e.g., 1 KB-1 MB of data), while separating platform configuration features from core services provided by the operating system (OS) manager.

Figure 1:
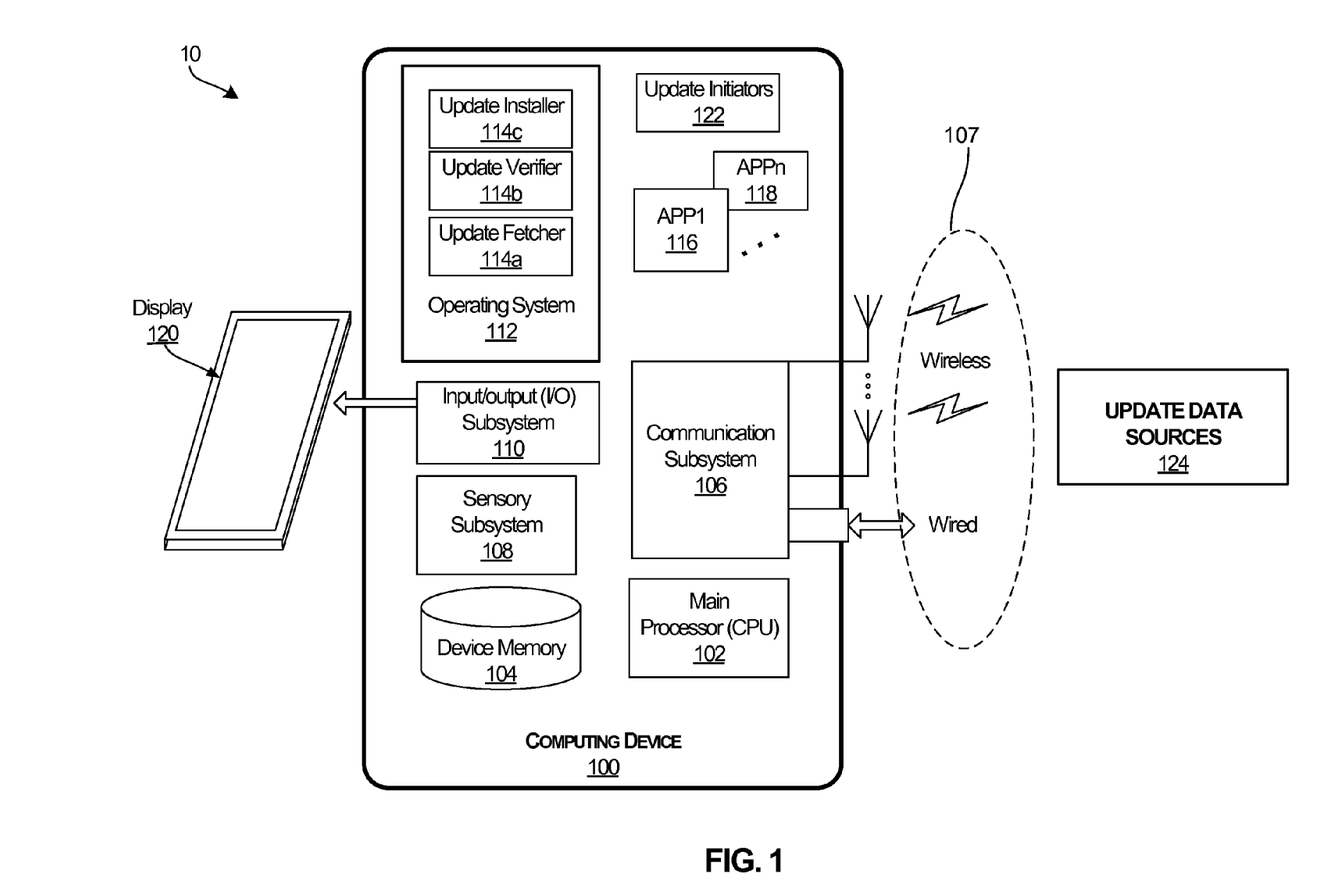
FIG. 1 is a block diagram illustrating an example architecture including a computing device with configuration file updating capabilities communicating with update data sources, in accordance with an example embodiment of the disclosure.

FIG. 1 is a block diagram illustrating an example architecture including a computing device with configuration file updating capabilities communicating with update data sources, in accordance with an example embodiment of the disclosure. Referring to FIG. 1, the example architecture 10 may comprise a computing device 100 and update data sources 124.

The computing device 100 may include a handset, a smartphone, a tablet, a laptop, and/or another handheld or portable device. The computing device 100 may comprise, for example, a main processor 102, a system memory 104, a communication subsystem 106, a sensory subsystem 108, an input/output (I/O) subsystem 110, and a display 120. The computing device may also comprise an operating system 112, one or more applications 116, . . . , 118 running on the computing device 100, and update initiators 122. The operating system 112 may comprise an update fetcher 114a, an update verifier 114b, and an update installer 114c.

The main processor 102 may comprise suitable logic, circuitry, interfaces, and/or code that may be operable to process data, and/or control and/or manage operations of the computing device 100, and/or tasks and/or applications performed therein in connection with the anonymization framework 100. In this regard, the main processor 102 may be operable to configure and/or control operations of various components and/or subsystems of the computing device 100, by utilizing, for example, one or more control signals. The main processor 102 enables running and/or execution of applications, programs and/or code (e.g., one or more applications 116, . . . , 118, the update initiators 122, and/or the update fetcher, verifier and installer 114a-114c within the operating system 112), which may be stored, for example, in the system memory 104. Alternatively, one or more dedicated application processors may be utilized for running and/or executing applications (or programs) (e.g., one or more applications 116, . . . , 118, the update initiators 122, and/or the update fetcher, verifier and installer 114a-114c within the operating system 112) in the computing device 100.

In some instances, one or more of the applications 116, . . . , 118 running and/or executing on the computing device 100 may generate and/or update video content that may be rendered via the display 120.

The system memory 104 may comprise suitable logic, circuitry, interfaces, and/or code that may enable permanent and/or non-permanent storage, buffering, and/or fetching of data, code and/or other information, which may be used, consumed, and/or processed. In this regard, the system memory 104 may comprise different memory technologies, including, for example, read-only memory (ROM), random access memory (RAM), Flash memory, solid-state drive (SSD), and/or field-programmable gate array (FPGA). The system memory 104 may store, for example, configuration data, which may comprise parameters and/or code, compris-ing software and/or firmware (e.g., the operating system 112, the update initiators 122 and/or the one or more applications 116, . . . , 118).

The communication subsystem 106 may comprise suitable logic, circuitry, interfaces, and/or code operable to communicate data from and/or to the computing device, such as via one or more wired and/or wireless connections 107. The communication subsystem 106 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 100, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 106 may provide wired and/or wireless connections to, for example, the analysis server 130 via the wired and/or wireless connections 107.

The sensory subsystem 108 may comprise suitable logic, circuitry, interfaces, and/or code for obtaining and/or generating sensory information, which may relate to the computing device 100, its user(s), and/or its environment. For example, the sensory subsystem 108 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 110 may comprise suitable logic, circuitry, interfaces, and/or code for enabling user interactions with the computing device 100, enabling obtaining input from user(s) and/or to providing output to the user(s). The I/O subsystem 110 may support various types of inputs and/or outputs, including, for example, video, audio, and/or textual. In this regard, dedicated I/O devices and/or components, external to or integrated within the computing device 100, may be utilized for inputting and/or outputting data during operations of the I/O subsystem 110. Example I/O devices may comprise displays, mice, keyboards, touchscreens, voice input interfaces, and other input/output interfaces or devices. With respect to video outputs, the I/O subsystem 110 may be operable to generate and/or process video content, graphics, and/or textual data, and/or generate video frames based thereon for display, via the display 120 for example.

The display 120 may comprise suitable logic, circuitry, interfaces and/or code that may enable displaying of video content, which may be handled and/or processed via the I/O subsystem 110. The display 120 may be used in outputting video data.

The operating system 112 may include software that is used to manage the various hardware resources of the computing device 100. The operating system 112 may also be used to provide common services to computer programs or applications, such as the one or more applications 116, . . . , 118. The operating system 112 may act as an intermediary between the hardware components and the one or more applications 116, . . . , 118. In some implementations, processes in the operating system 112 (e.g., the update fetcher, verifier and installer 114a-114c) may be used to download, verify and install one or more configuration file updates. In accordance with an example embodiment of the disclosure, the update verifier 114*b* and the update installer 114*c* may be secure (or trusted) components of the OS 112.

The update initiators 122 may comprise suitable circuitry, logic and/or code and may be operable to initiate one or more updates to at least one configuration setting of the computing device 100. As illustrated in FIG. 1, the update initiators 122 may be implemented outside of the core operating system (OS) 112 (a more detailed view of example update initiators is illustrated and discussed in reference to FIG. 2A). In this regard, the update initiators 122 may be implemented as, for example, a content consuming application installed on the computing device (e.g., one or more of the applications 116, . . . , 118), a component of a computing platform of the computing device 100, and/or an update-seeker application installed on the computing device. The update-seeker application may be a device-native application that periodically monitors an external network device (e.g., monitors the update data sources 124 via the wired or wireless connection 107) for updates to the OS 112 and/or to one or more configuration settings of the computing device 100. Since the update initiators 122 may include unsecure code or applications, an update to a configuration setting may be initiated by an intent (command) from an untrusted (or unsecure) component of the update initiators 122.

The one or more applications 116, . . . , 118 may include one or more software applications (i.e., computer programs) that may help a user of the computing device 100 perform a specific task. For example, a software application may include an interactive application that displays content to a user and allows the user to provide input as to the manner in which the content is provided and/or the type of content that is provided. To perform a task (e.g., web browsing, video playback, etc.), the one or more applications 116, . . . , 118 may access the CPU 102, the memory 104, and/or any other circuit within the computing device 100, as well as the operating system 112.

The update data sources 124 may comprise suitable circuitry, logic and/or code and may include one or more unsecure or secure sources of updates to configuration settings and/or to the OS 112 for the computing device 100 (and/or other similar devices within a device ecosystem using the OS 112).

In operation, a configuration file update may be initiated via an intent (e.g., a command) from a component of the update initiators 122 (e.g., a content consumer, a computing platform, and/or a monitoring service, for example). The content consumer, computing platform, and monitoring service may be unsecure components that may require software updates, as explained in greater detail in reference to FIG. 2A. The update fetcher 114*a* may be operable to download the update content from the update data sources 124. The update content may include, for example, configuration update data and configuration update metadata, which may be used to authenticate the configuration update data (as explained in more detail herein below in reference to FIG. 2A). The update verifier 114*b* (which is a secure, or trusted, component of the OS 112) may verify the update data and the update metadata. If the update data is verified, it may be sent to the update installer 114*c* (also a secure, or trusted, component of the OS 112), which may install the configuration file update.

Figure 2A:
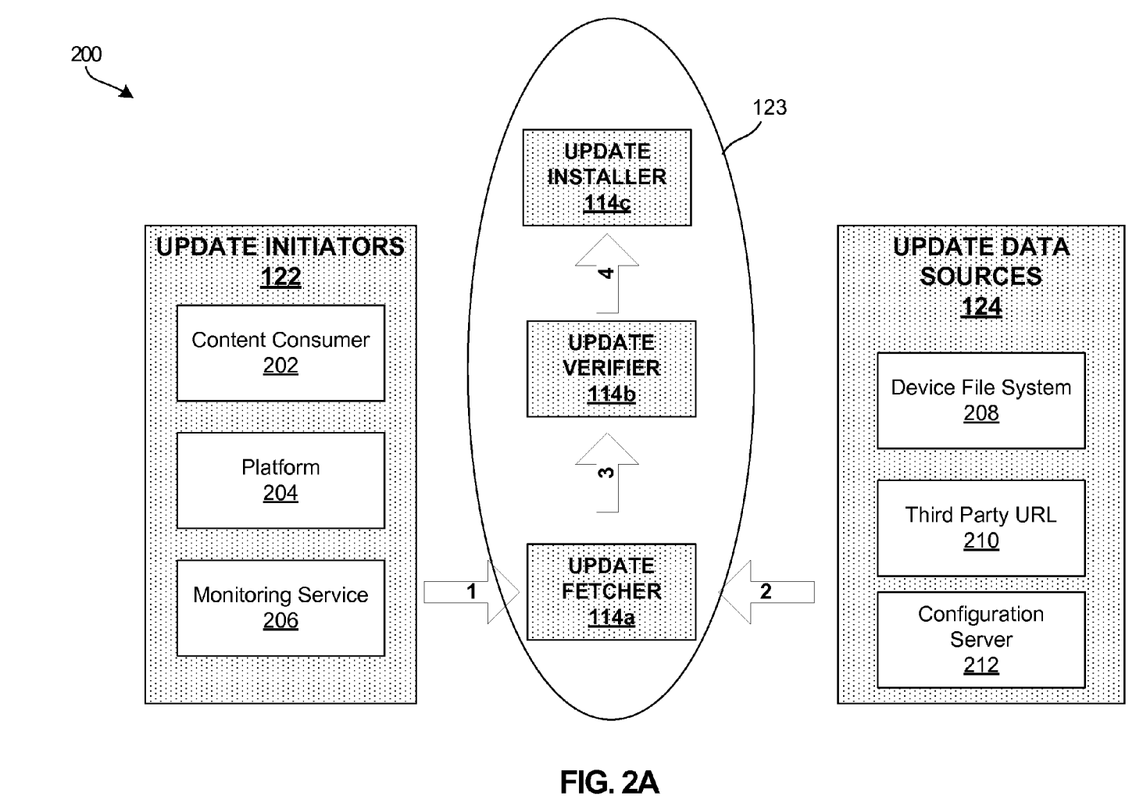
FIG. 2A is a block diagram illustrating an example architecture of a configuration file updater, in accordance with an example embodiment of the disclosure.

FIG. 2A is a block diagram illustrating an example architecture of a configuration file updater, in accordance with an example embodiment of the disclosure. Referring to FIG. 2A, the example architecture 200 may comprise the update initiators 122, the update data sources 124, and the update pipeline 123.

The update initiators 122 may comprise suitable circuitry, logic and/or code and may include a content consumer 202, computing platform 204, and monitoring service 206. The content consumer 202 may comprise, for example, one or more content consuming application installed on the computing device (e.g., one or more of the applications 116, . . . , 118). Such content consuming applications may require various updates, such as updates to application configuration settings. The configuration settings may be associated with, for example, certificate pinning, premium SMS services (e.g., updates to premium SMS toll phone numbers used by the application), and/or time zone information, which may vary from country to country.

The computing platform 204 may comprise, for example, a component of a computing platform of the computing device 100, which computing platform may require (from time to time) configuration file updates (e.g., update to one or more configuration settings). The monitoring service 206 may comprise, for example, an update-seeker application installed on the computing device 100. The monitoring service 206 may, at regular intervals, monitor the update data source 124 for any updates to the OS 112 and/or one or more configuration settings of the device 100.

The update initiators 122 may include components that send an appropriate intent (e.g., a command or request) for configuration file updates to the update fetcher 114*a*. In instances when it is desirable to have a server side drive the update cycle (e.g., a server hosting the update data sources 124), this functionality may be automatically handled by the monitoring service 206. Otherwise, the update intent (or command) may be send by the content consumer 202 directly to the update fetcher 114*a*.

The update pipeline 123 may comprise the update fetcher 114*a*, the update verifier 114*b* and the update installer 114*c* (the verifier and installer being secure or trusted components of the OS 112). In this regard, the update pipeline 123 has two major components: an untrusted update fetcher 114*a*, which is responsible for downloading signed content (e.g., the software updates), and the (trusted) verifier/installer components 114*b*-114*c*. Each of these components may comprise a base component that performs the majority of corresponding functions of the component, and a per-consumer component that may specialize the component for more finely-grained control.

Update Fetcher 114*a*

The update fetcher 114*a* may be implemented as BroadcastReceiver/Service pair. The broadcast receiver may exist to listen for incoming intents indicating either: (a) an update initiator (122) would like to start a new update, or (b) that a previous update has progressed to the point where it needs further attention. These events may start the appropriate service by the update fetcher 114*a*, which may cause the update fetcher 114*a* to download update content and metadata, perform initial data preprocessing of the downloaded update, and then hand the data off to the update verifier 114*b* and installer 114*c*. The update fetcher 114*a* may be operable to contact one or more update data sources 124 to download the necessary configuration file updates needed by the update initiators 122.

The initial intents received by the update fetcher 114*a* and used to initiate an update, may include URLs (as well as file paths), from which the update fetcher 114*a* may retrieve the update. This process may be useful for, for example, testing and sideloading. However, unverified updates downloaded by the update fetcher 114*a* may not be unconditionally trusted since any of the applications 116, . . . , 118 (or any of the update initiators 122) may send the intent (command) initiating a configuration file update.

Update Verifier 114b and Update Installer 114c

The update verifier 114b and installer 114c may be implemented as, for example, a BroadcastReceiver as part of a system server (separately or as a single module). The verifier 114b and installer 114c may listen for intents matching the action specified for its particular per-consumer component with the following additional data (which may be part of the content update data and/or content update metadata downloaded by the update fetcher 114a from the update data sources 124):

CONTENT_PATH—a local path to the untrusted content;

REQUIRED_HASH—the hash of the current update data or "0", if none should exist;

VERSION—the numeric version of the new data; and

SIGNATURE—the SHA512 with RSA signature of the content, hash, and version.

Once it has this data, the update verifier 114b may verify (e.g., by pulling a certificate from Settings.Secure): (a) that the hash of the current data matches the one required by the update; (b) that the version in the update is greater than the currently installed version; and/or (c) that the signature provided matches the above data. Once the verification is complete, the update installer 114c may copy the update content to a trusted location (e.g., on disk of the computing device 100 or memory 104) and the update may be complete.

Put another way, the update verifier 114b may use configuration file metadata of the update received from the update data source 124, and may verify that the hash of the current update data (e.g., the current version of the specific configuration component that is being updated) matches the one required by the update (i.e., the update data has metadata that includes a hash, and the update data hash has to match the hash of the current version of the configuration component, otherwise the update may not be installed). In instances when the current hash does not match (e.g., if the device has been turned OFF for a long period of time, missing intermediate configuration updates), the device may be prompted to download the missing configuration updates, or such missing intermediate configuration updates may be automatically installed.

The update verifier 114b may also use the metadata of the update received from the update data source 124, and may verify that the version in the update is greater than the currently installed version of the configuration component or file, and that the signature provided in the update metadata matches the above update data.

Update Data Sources 124

The update data sources may include device file system 208, a third party URL 210 or a configuration server 212. The device file system 208 may comprise suitable circuitry, logic and/or code and may include, for example, an external data source (e.g., an SD card) with configuration file update data and update metadata. The SD card may be inserted in the computing device 100 and the update fetcher 114a may download the configuration file update from the SD card. The third party URL 210 may comprise suitable circuitry, logic and/or code and may include web-accessible Internet page, where the configuration file update may be downloaded from. The configuration server 212 may comprise suitable circuitry, logic and/or code and may include one or more remote network servers, which the computing device 100 may access via wired/wireless connection 107 to download the configuration file update.

Update data provided by the update data sources 124 may have certain restrictions, such as:

(a) It may be reachable via an http://, https:// or file:// URL;

(b) It may be served as two files: one containing update content and the other containing the update metadata specified above; and (c) It may be of limited size (e.g., not larger than 1 MB).

The configuration update metadata may be in the following form:

SIGNATURE:<sig>
VERSION:<int>
REQUIRED_HASH:<hash>

Where <sig> may be a base64-encoded SHA512withRSA signature, <int> may be a base-10 integer in the range of [0, Integer.MAX_VALUE), and <hash> may be a base-16 SHA512 hash of the current value or "0", if the currently downloaded configuration file update is the first update, or NONE if this value should not be checked. The configuration update data content may comprise arbitrary data, including binary blobs.

Figure 2B:
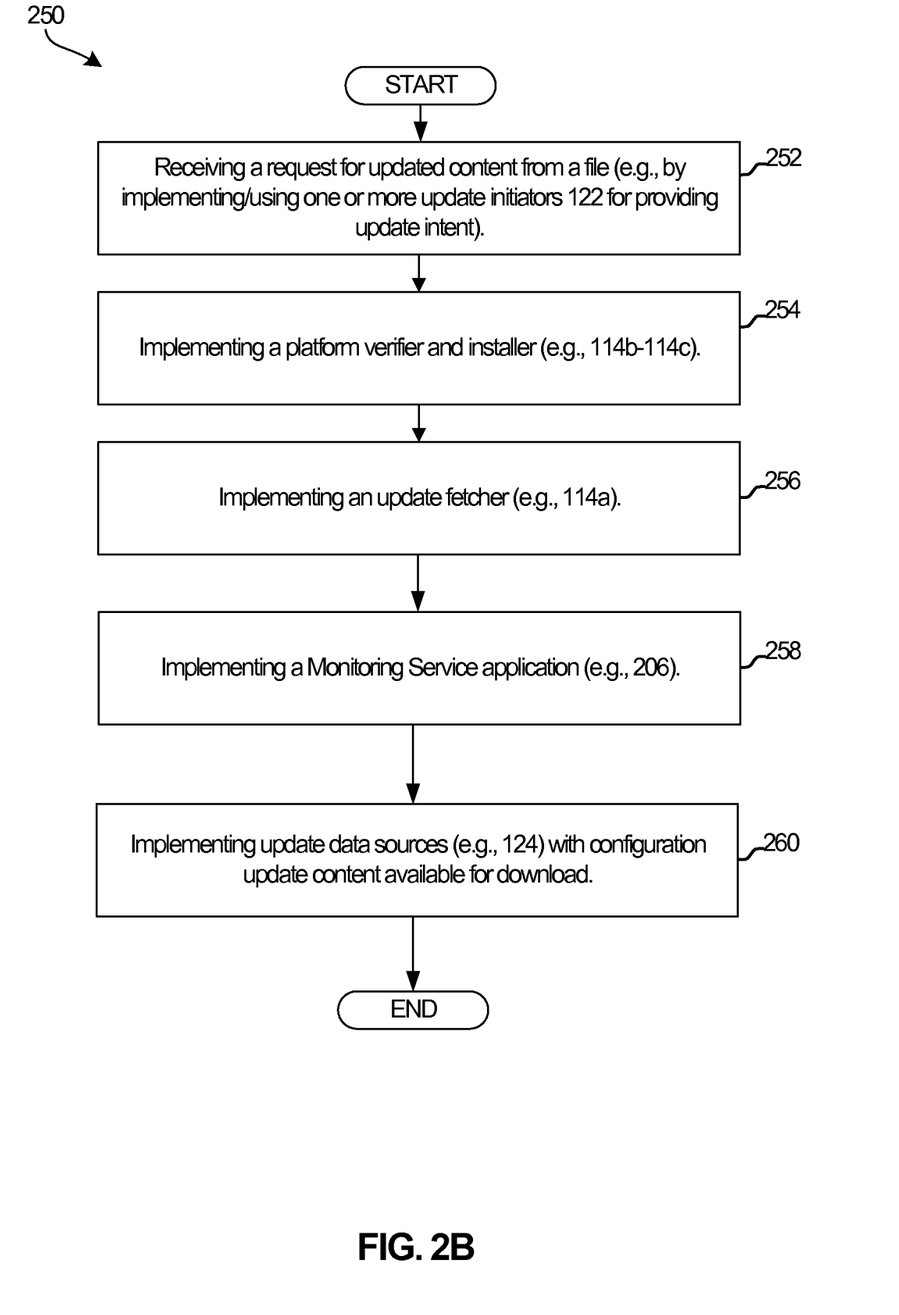
FIG. 2B is a flow chart illustrating example steps of a method for enabling a configuration updater, in accordance with an example embodiment of the disclosure.

FIG. 2B is a flow chart illustrating example steps of a method for enabling a configuration updater, in accordance with an example embodiment of the disclosure. In accordance with an example embodiment of the disclosure, a configuration updater (e.g., as illustrated in FIG. 2) may be enabled by perform the method 250, which may start at step 252, a request for updated content may be received from a file (e.g., by implementing/using one or more of the update initiators 122 for providing update intent). At 254, a platform verifier and installer may be implemented (e.g., 114b-114c). At 256, an update fetcher (e.g., 114a) may be implemented. At 258, a monitoring service application (e.g., 206) may be implemented. The monitoring service application may include an update-seeker application installed on the computing device 100. The monitoring service 206 may, at regular intervals, monitor the update data source 124 for any updates to the OS 112 and/or one or more configuration settings of the device 100. At 260, update data sources (e.g., 124) may be implemented, with configuration update content available for download.

The update initiators 122 may provide for one or more options in resolving a configuration update in instances when a device that has been offline for a long period of time (e.g., for months) and then comes back up. In this case, missing updates may be automatically downloaded and installed, or the device may be prompted to do so upon user approval. The update initiators 122 may also provide various notifications of completed configuration updates (e.g., prior to update or after successful update install).

Figure 3:
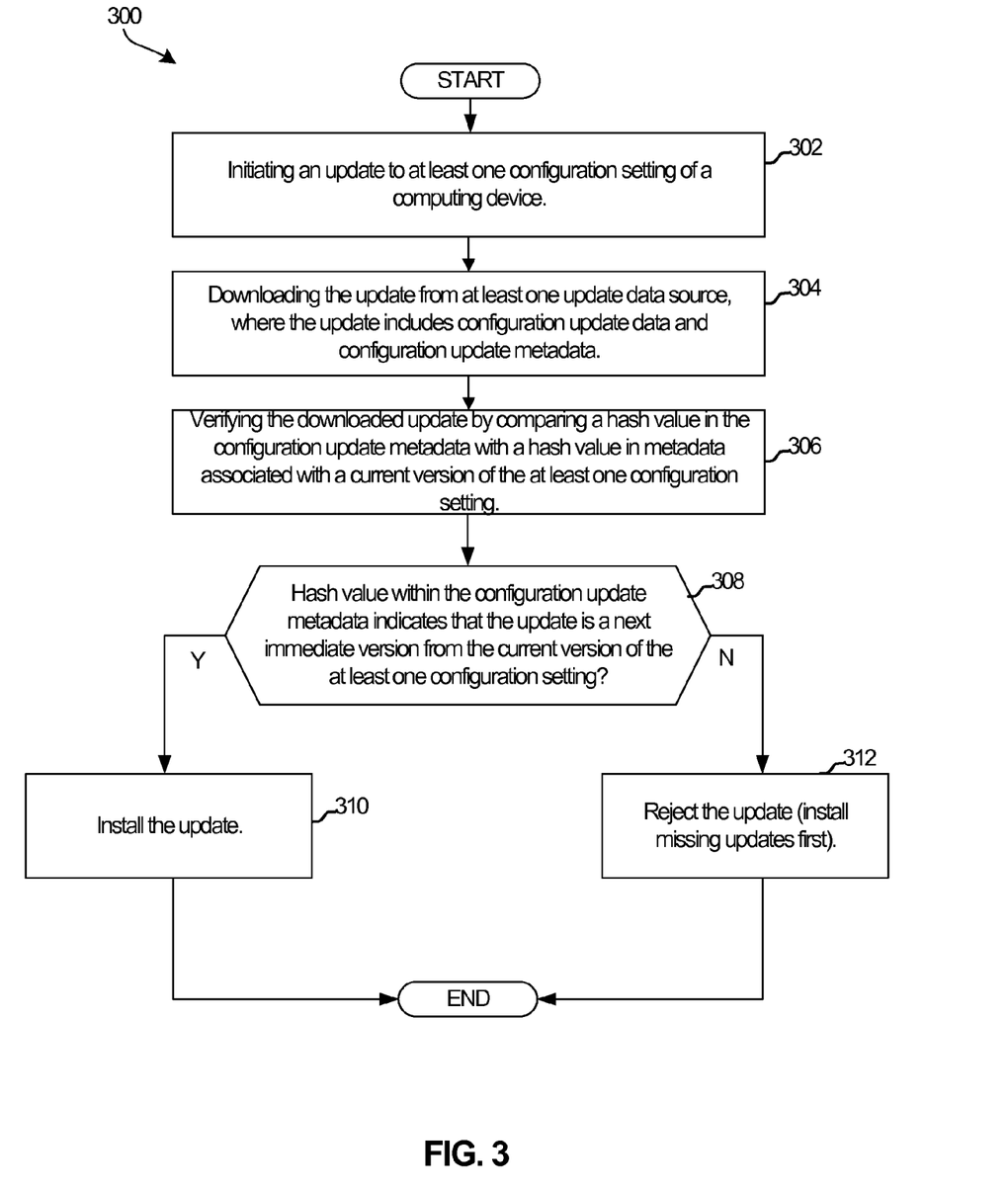
FIG. 3 is a flow chart illustrating example steps of a method for updating configuration information, in accordance with an example embodiment of the disclosure.

FIG. 3 is a flow chart illustrating example steps of a method for updating configuration information, in accordance with an example embodiment of the disclosure. Referring to FIGS. 1-3, the example method 300 may start at 302, when an update to at least one configuration setting of a computing device 100 may be initiated (e.g., by one or more of the update initiators 122). At 304, the update may be downloaded (by the update fetcher 114a) from at least one update data source (e.g., 208-212 in 124). The update may include configuration update data and configuration update metadata (as explained herein above). At 306, the downloaded update may be verified (e.g., by the update verifier 114b) by comparing a hash value in the configuration update metadata with a hash value in the metadata associated with a current version of the at least one configuration setting.

At 308, it may be determined whether the hash value within the configuration update metadata indicates that the update is a next immediate version from the current version of the at least one configuration setting (e.g., the hash value within the configuration update metadata matches a hash value of the current version of the at least one configuration setting). If there is a match, at 310, the update is installed. If there is no match, at 312, the update is rejected and not installed. Optionally, any missing configuration updates may be installed automatically or with user approval.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for updating configuration information.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a hardware processor, memory, and a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for updating configuration information, comprising:
　in a computing device including a processor, memory, and an operating system, initiating an update to at least one configuration setting of the computing device;
　downloading the update from at least one update data source using an update fetcher, wherein the update comprises configuration update data and configuration update metadata, the configuration update metadata indicating a version of the update and at least one configuration setting necessary for the update;
　performing a comparison of the configuration update metadata with metadata associated with a current version of the at least one configuration setting using an update verifier;
　responsive to the comparison indicating that the update is not the next immediate version from the current version of the at least one configuration setting, rejecting the update; and
　downloading at least one intermediate update to the at least one configuration setting of the computing device, wherein the configuration update metadata indicates that the update is a next immediate version from the version of the at least one configuration setting after installation of the at least one intermediate update.

2. The method according to claim 1, comprising:
　initiating the update to the at least one configuration setting based on an intent from an unsecure component of the computing device.

3. The method according to claim 2, wherein the unsecure component comprises one or more of:
　a content consuming application installed on the computing device;
　a component of a computing platform of the computing device; and
　an update-seeker application installed on the computing device.

4. The method according to claim 1, wherein the configuration update metadata comprises one or more of:
　a hash value, wherein the hash value is based on at least one configuration setting necessary for the update;
　a version number of the update; and
　a signature of the update.

5. The method according to claim 4, wherein the comparison comprises:
　comparing the hash value within the configuration update metadata with a hash value associated with the current version of the at least one configuration setting.

6. The method according to claim 1, comprising:
　responsive to the comparison indicating that the update is a next immediate version from the current version of the at least one configuration setting, installing the update.

7. The method according to claim 1, wherein the at least one configuration setting comprises one or more of:
　a configuration setting related to certificate pinning; a configuration setting related to premium SMS services available to the computing device; and
　a configuration setting related to time zone information.

8. A non-transitory, machine-readable storage medium, having stored thereon a computer program having at least one code section for updating configuration information, the at least one code section being executable by a machine including a processor, memory, and an operating system, for causing the machine to perform a method comprising:
　initiating an update to at least one configuration setting of the computing device;
　controlling an update fetcher for downloading the update from at least one update data source, wherein the update comprises configuration update data and configuration update metadata, the configuration update metadata indicating a version of the update and at least one configuration setting necessary for the update;
　controlling an update verifier for performing a comparison of the configuration update metadata with metadata associated with a current version of the at least one configuration setting;

responsive to the comparison indicating that the update is not the next immediate version from the current version of the at least one configuration setting, rejecting the update; and downloading at least one intermediate update to the at least one configuration setting of the computing device, wherein the configuration update metadata indicates that the update is a next immediate version from the version of the at least one configuration setting after installation of the at least one intermediate update.

9. The non-transitory, machine-readable storage medium according to claim 8, wherein the at least one code section comprises code for:

initiating the update to the at least one configuration setting based on an intent from an unsecure component of the computing device.

10. The non-transitory, machine-readable storage medium according to claim 9, wherein the unsecure component comprises one or more of:

a content consuming application installed on the computing device;

a component of a computing platform of the computing device; and an update-seeker application installed on the computing device.

11. The non-transitory, machine-readable storage medium according to claim 8, wherein the configuration update metadata comprises one or more of:

a hash value, wherein the hash value is based on at least one configuration setting necessary for the update;

a version number of the update; and a signature of the update.

12. The non-transitory, machine-readable storage medium according to claim 11, wherein the comparison comprises:

comparing the hash value within the configuration update metadata with a hash value associated with the current version of the at least one configuration setting.

13. The non-transitory, machine-readable storage medium according to claim 12, wherein the at least one code section comprises code for:

responsive to the comparison indicating that the update is a next immediate version from the current version of the at least one configuration setting, installing the update.

14. The non-transitory, machine-readable storage medium according to claim 8, wherein the at least one configuration setting comprises one or more of:

a configuration setting related to certificate pinning;

a configuration setting related to premium SMS services available to the computing device; and a configuration setting related to time zone information.

15. A system for updating configuration information, comprising:

a computing device including at least one processor, memory, and an operating system, the at least one processor operable to:

initiate an update to at least one configuration setting of the computing device;

download the update from at least one update data source using an update fetcher, wherein the update comprises configuration update data and configuration update metadata, the configuration update metadata indicating a version of the update and at least one configuration setting necessary for the update;

performing a comparison of the configuration update metadata with metadata associated with a current version of the at least one configuration setting using an update verifier;

responsive to the comparison indicating that the update is not the next immediate version from the current version of the at least one configuration setting, reject the update; and download at least one intermediate update to the at least one configuration setting of the computing device, wherein the configuration update metadata indicates that the update is a next immediate version from the version of the at least one configuration setting after installation of the at least one intermediate update.

16. The system according to claim 15, wherein the at least one processor is operable to initiate the update to the at least one configuration setting based on an intent from an unsecure component of the computing device.

17. The system according to claim 16, wherein the unsecure component comprises one or more of:

a content consuming application installed on the computing device;

a component of a computing platform of the computing device; and an update-seeker application installed on the computing device.

18. The system according to claim 15, wherein the configuration update metadata comprises one or more of:

a hash value, wherein the hash value is based on at least one configuration setting necessary for the update;

a version number of the update; and a signature of the update.

19. The system according to claim 15, wherein the comparison comprises:

comparing the hash value within the configuration update metadata with a hash value associated with the current version of the at least one configuration setting.

20. The system according to claim 15, wherein the at least one code section comprises code for:

responsive to the comparison indicating that the update is a next immediate version from the current version of the at least one configuration setting, installing the update.

* * * * *